US012694024B2

(12) United States Patent 
Bosnjakovic et al.

(10) Patent No.: US 12,694,024 B2 
(45) Date of Patent: Jul. 28, 2026

(54) REFUSAL SYSTEM

(71) Applicant: Intuit Inc., Mountain View, CA (US)

(72) Inventors: Dusan Bosnjakovic, Los Angeles, CA (US); Prarit Lamba, San Diego, CA (US); Shivakumara Narayanaswamy, San Jose, CA (US); Anmol Joshi, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 19/001,970

(22) Filed: Dec. 26, 2024

(65) Prior Publication Data

US 2026/0187064 A1 Jul. 2, 2026

(51) Int. Cl.
G06F 16/2452 (2019.01)
G06F 16/21 (2019.01)

(52) U.S. Cl.
CPC ...... G06F 16/24524 (2019.01); G06F 16/211 (2019.01)

(58) Field of Classification Search
CPC .......................... G06F 16/24524; G06F 16/211
USPC ......................................................... 707/718
See application file for complete search history.

(56) References Cited

U.S. PATENT DOCUMENTS

| | | | |
|---|---|---|---|
| 7,840,556 B1 * | 11/2010 | Dayal | ................. G06F 16/2453 707/999.003 |
| 2005/0043961 A1 * | 2/2005 | Torres | ..................... G06F 21/55 705/35 |
| 2018/0150361 A1 * | 5/2018 | Khandelwal | ...... G06F 16/24534 |
| 2019/0286978 A1 * | 9/2019 | Aggarwal | ............. G06F 16/212 |
| 2022/0215948 A1 * | 7/2022 | Bardot | .................... G16H 40/40 |
| 2025/0110957 A1 * | 4/2025 | Baldua | ................ G06F 16/2425 |
| 2025/0225108 A1 * | 7/2025 | Sharma | ................. G06F 16/211 |

* cited by examiner

*Primary Examiner* — Kuen S Lu
(74) *Attorney, Agent, or Firm* — Dinsmore & Shohl LLP

(57) ABSTRACT

Certain aspects of the disclosure provide techniques for selecting functions. An example method includes receiving, as input, a user query; obtaining a plurality of function schemas that include function descriptions and examples for a plurality of functions; generating, for the user query and based on the plurality of function schemas, a plurality of similarity scores, the plurality of similarity scores including a respective set of similarity scores for each function of the plurality of functions; selecting, based on the plurality of similarity scores and a plurality of function-specific thresholds corresponding to the plurality of functions, a subset of the functions as relevant functions for the user query; generating a function plan that comprises one or more function definitions for one or more functions of the subset of the functions; and executing the function plan.

20 Claims, 7 Drawing Sheets

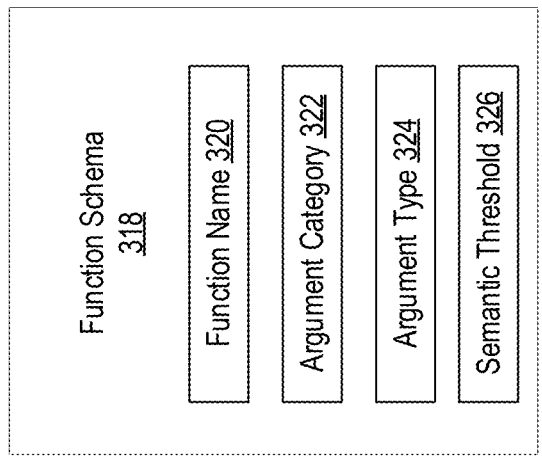
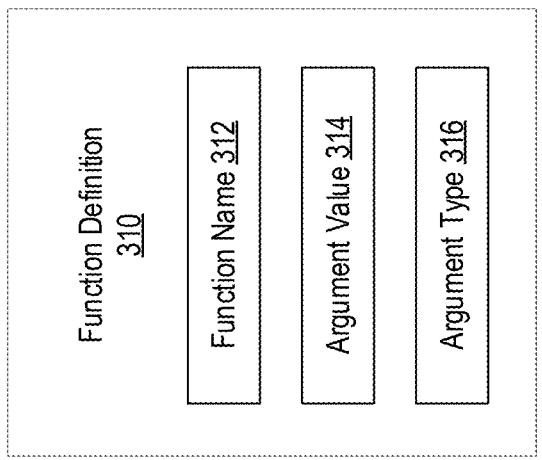
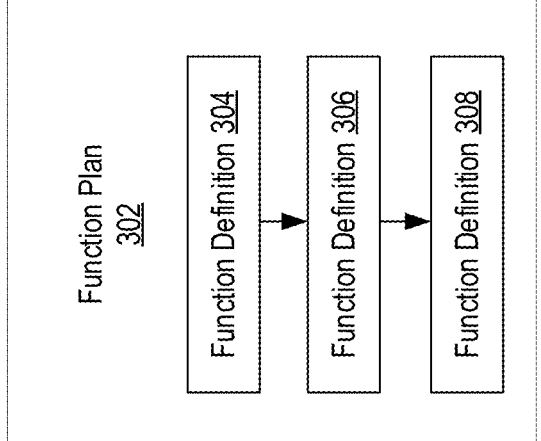
*FIG. 3*

600

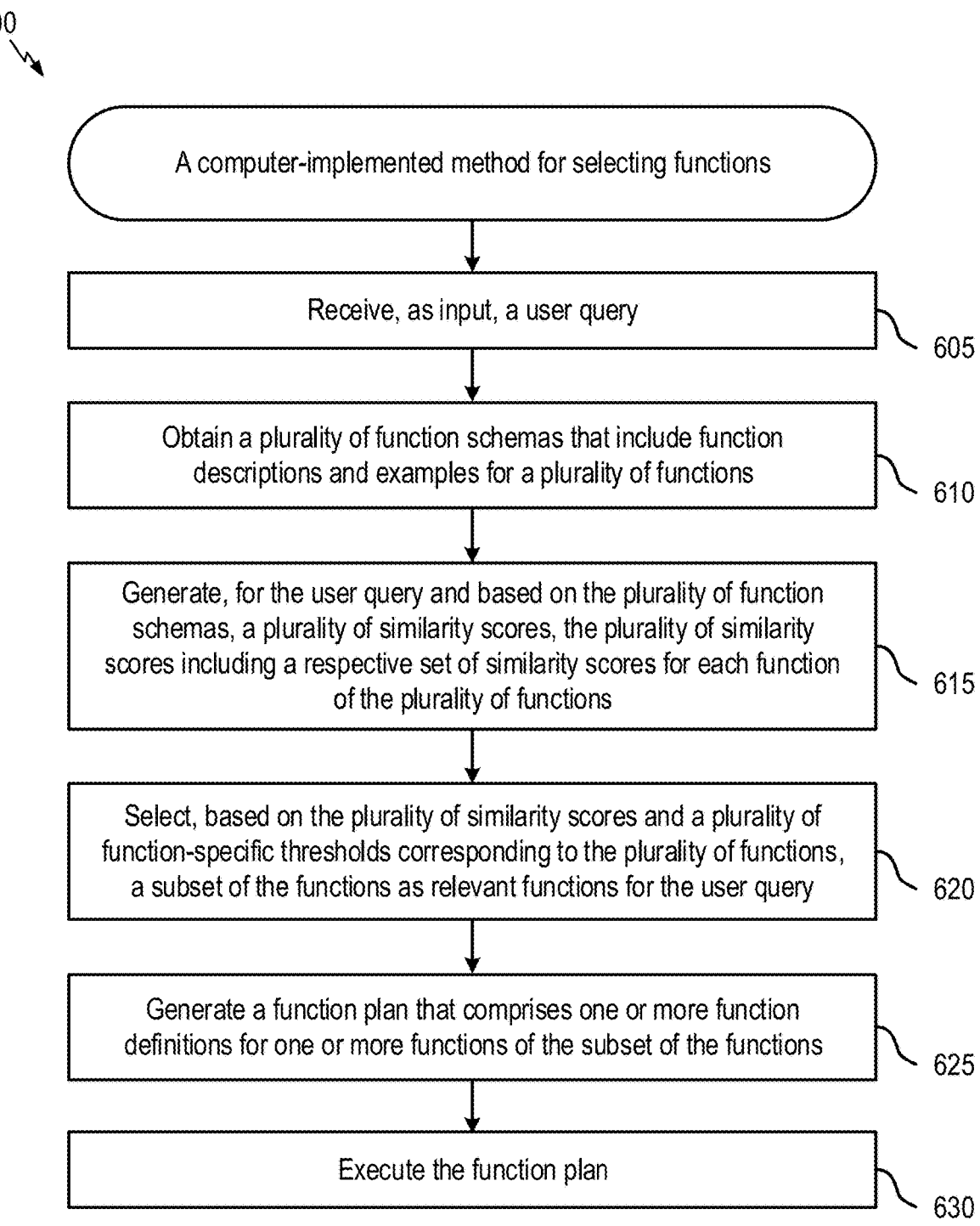

A computer-implemented method for selecting functions

Receive, as input, a user query ⟍ 605

Obtain a plurality of function schemas that include function descriptions and examples for a plurality of functions ⟍ 610

Generate, for the user query and based on the plurality of function schemas, a plurality of similarity scores, the plurality of similarity scores including a respective set of similarity scores for each function of the plurality of functions ⟍ 615

Select, based on the plurality of similarity scores and a plurality of function-specific thresholds corresponding to the plurality of functions, a subset of the functions as relevant functions for the user query ⟍ 620

Generate a function plan that comprises one or more function definitions for one or more functions of the subset of the functions ⟍ 625

Execute the function plan ⟍ 630

*FIG. 6*

REFUSAL SYSTEM

BACKGROUND

Field

Aspects of the present disclosure relate to systems and methods for filtering a set of functions, such as in the context of generating a function plan using generative artificial intelligence.

Description of Related Art

Generative artificial intelligence (GenAI) refers to machine learning models that are able to create new content based on patterns and information learned from training data in combination with a user prompt. The user prompt provides instruction to the model on what new content to generate and how to generate that new content. Notably, the model is able to generate new content based on both the actual information (e.g., facts, knowledge) included in the training data, as well as patterns, insights, and model parameter weights learned from the training data.

GenAI models are able to generate new content in many different forms, including text, image, audio, and even video. For example, to facilitate text generation, some GenAI models are configured as language models (LMs). An LM is generally a type of machine learning model that is designed to understand, generate, and manipulate human language. More specifically, an LM is a probabilistic framework that determines the likelihood of a sequence of words or tokens. At its core, a LM attempts to predict the probability of the next word in a sentence given the preceding words. The model estimates these probabilities based on the patterns it learned during training. LMs are useful in natural language processing (NLP) and computational linguistics for performing a range of tasks involving human language.

LMs have a wide array of applications, including: text generation (e.g., producing coherent and contextually appropriate text; machine translation (e.g., converting text from one language to another); speech recognition (e.g., converting spoken language into text); text summarization (e.g., condensing a long piece of text into a shorter summary); sentiment analysis (e.g., determining the sentiment expressed in a piece of text); and question answering (e.g., automatically providing answers to questions posed in natural language).

While language models represent a transformative force in many industries by assimilating vast amounts of knowledge, such as to build conversation-driven applications, these models are not without limitation. For example, while a powerful tool, an LM may have a context window that represents the maximum amount of text (tokens) that the LM can process and consider at any given time during a conversation or task. The context window may include both input text and a generated response based on the input text. If care is not taken to adhere to the LM's context window, the LM may provide suboptimal answers (due to constraints on the available context window for an answer) or may disregard some inputs.

SUMMARY

Certain aspects provide a computer-implemented method for selecting functions. The method includes receiving, as input, a user query; obtaining a plurality of function schemas that include function descriptions and examples for a plurality of functions; generating, for the user query and based on the plurality of function schemas, a plurality of similarity scores, the plurality of similarity scores including a respective set of similarity scores for each function of the plurality of functions; selecting, based on the plurality of similarity scores and a plurality of function-specific thresholds corresponding to the plurality of functions, a subset of the functions as relevant functions for the user query; generating a function plan that comprises one or more function definitions for one or more functions of the subset of the functions; and executing the function plan.

Certain aspects provide a method for selecting functions. The method includes receiving, as input, a user query; obtaining a plurality of function schemas that include function descriptions and examples for a plurality of functions; generating, for the user query and based on the plurality of function schemas, a plurality of similarity scores, the plurality of similarity scores including a respective set of similarity scores for each function of the plurality of functions; selecting, based on the plurality of similarity scores and a plurality of function-specific thresholds corresponding to the plurality of functions, a subset of the functions as relevant functions for the user query; generating, using a language model (LM) based service, a function plan that comprises one or more function definitions for one or more functions of the subset of the function; and executing the function plan.

Certain aspects provide a method including receiving, as input, a user query relating to a task; obtaining a plurality of function schemas that include function descriptions and examples for a plurality of functions; generating, for the user query and based on the plurality of function schemas, a plurality of similarity scores, the plurality of similarity scores including a respective set of similarity scores for each function of the plurality of functions; selecting, based on the plurality of similarity scores and a plurality of function-specific thresholds corresponding to the plurality of functions, a subset of the functions as relevant functions for performing the task relating to the user query; generating, by a LM based service, a function plan that comprises one or more function definitions for one or more functions of the subset of the functions, the one or more function; and executing the function plan to perform the task.

Other aspects provide processing systems configured to perform the aforementioned methods as well as those described herein; non-transitory, computer-readable media comprising instructions that, when executed by a processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more aspects.

DESCRIPTION OF THE DRAWINGS

The appended figures depict certain aspects and are therefore not to be considered limiting of the scope of this disclosure.

FIG. 3 depicts an example of a function schema, a function plan and a function definition.

FIG. 6 depicts a method for a refusal system.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
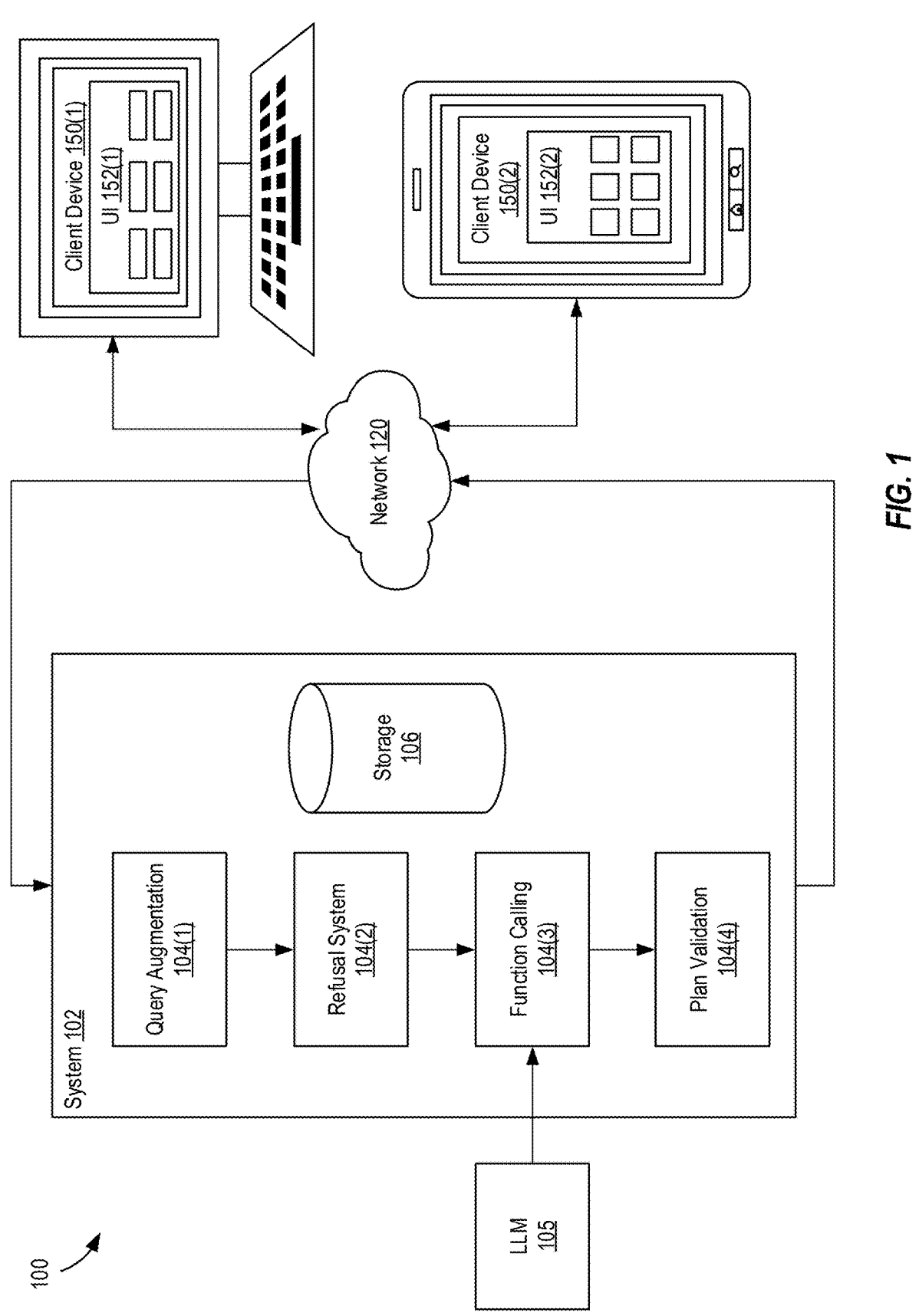
FIG. 1 depicts a computing system configured to perform plan validation.

Automated assistants are applications that can be used to provide users with product and/or service assistance in a comprehensive and cost-effective manner. One type of automated assistant comes in the form of a chatbot, which is a software feature designed to simulate a conversation with human users. The chatbot is typically configured as a text-based user interface, much like a smart-phone's text messaging user interface, where a user is able to type an input which is submitted to the software and the software outputs a response to the user input. In some configurations, the inputs and outputs appear as distinct text bubbles in sequential order as a means to display the conversation to the user.

In some cases, automated assistants are configured to provide responses to user inputs based on a preset or rule-based conversation response. Rule-based automated assistants use if/then logic to respond to the user input based on a previously generated map of potential user inputs and corresponding outputs thought to be helpful in responding to the user inputs. Such automated assistants can also access pre-approved content databases to retrieve additional information or links to provide other helpful information to the user if the previously generated rule matches one of the content datasets included in the pre-approved content databases. While these rule-based automated assistants provide consistent and pre-vetted responses to users, such assistants are constrained and limited in their ability to provide tailored and customized responses to user inputs, especially when the user inputs do not match well to any of the pre-defined rules or conversation maps. For example, if a user input is not addressed by a pre-defined rule or conversation map, a rule-based automated assistant may provide an error, fail to process the user, and/or escalate to a human intervention, which is resource-intensive and impacts user experience.

In order to improve the quality and customization of outputs, automated assistants may employ different machine learning models, such as language models (LMs), that can be trained to generate responses to different user questions or queries. Some LMs are trained specifically for text generation, often referred to as large language models (LLMs) because of the extensive amount of data on which they are trained and the size of these models relative to other LMs. LMs are configured to receive a user input (e.g., user query) that requests a text output from the model. The LM then generates a text output based on the user input using the information, context, and model parameter weighting learned during the LM's extensive training process.

In addition to generating text outputs, users may request an automated assistant to perform one or more specified actions, including accessing databases, generating or transmitting documents, or other tasks. For example, a user may request that the automated assistant gather information and then generate a document, such as a report or email, to fill in a form. To facilitate the completion of these actions or tasks, an automated assistant can be configured to access function databases that store different functions, or to use application programming interfaces (APIs) to call functions to perform various tasks. These functions can be static or rule-based functions, machine learning-based functions, or even generative functions using LLMs described above. Functions are typically defined based on a function schema, which includes the function name, arguments (e.g., function inputs), the function code, and function outputs. Each argument may associated with at least a value and a type (e.g., string, integer, etc.). Each value and/or type may be associated with an acceptable range, list, or other boundaries defined in the function schema to ensure proper functionality and accurate outputs of the function.

Thus, some automated assistants may be configured to use a combination of both generative models and other functions to be able to generate high quality, tailored responses for a wide range of different user inputs. However, challenges arise with the usage of LM-based services, including LLM-backed automated assistants, such as adhering to an LM-based service's context window.

For example, an LM has a context window. A context window represents the maximum amount of text (tokens) that the LM can process and consider at any given time during a conversation or task. For example, the context window may be thought of as a "working memory" of the LM, since the context window includes both the input text and the generated response. Text is broken into tokens (parts of words or characters), and the window size is measured in these tokens. Everything the LM needs to reference or respond to must fit within this context window. Once the context window fills up, older content gets pushed out and is no longer accessible to the LM, creating a "sliding window" effect in longer conversations. Processing constraints also come into play, as longer context windows require more computational resources, and processing time and costs typically scale with context length. This often creates a trade-off between context length and model performance. These limitations affect task completion, as tasks requiring analysis of very long documents (or large numbers of functions or function schemas) may need to be broken into chunks, and complex reasoning across large amounts of text becomes challenging. This may mean that very long inputs leave little room for detailed responses, or that the quality of a response is degraded as the input and conversation history approaches the context window size.

However, to build an effective function planning system, a large number of function schemas may need to be considered by the LM. For example, the addressable set of actions that can be taken by the LM-based service may be large, and each of these actions may be accomplished using a function or a set of functions. Without taking action to mitigate the context window constraint, an LM-based service may provide subpar function planning, particularly in response to complex queries or over the course of a longer function planning session. For example, the LM-based service may fail to identify an appropriate function due to the appropriate function being outside a context window of the function planning system, thereby using processing resources to generate a plan that omits the appropriate function. As another example, the LM-based service may generate a function plan that is constrained by a remaining context window, thereby providing suboptimal performance and potentially failing to address a user query (which leads to further processing resource usage to generate a new function plan that better addresses the user query). Furthermore, even if the context window is not exceeded, it may be beneficial and may conserve processing and memory resources to reduce a size of an input to the LM.

Systems and methods are described herein which overcome the aforementioned technical problems and improve upon the state of the art by introducing a refusal system that filters a plurality of available functions, based on a user query, so that a subset of the available functions are input to an LM-based service for function planning. For example, the refusal system may be implemented at a processing system as a semantic matching component (such as semantic matching component 202 of FIG. 2). The semantic matching module performs semantic matching between a user query and a plurality of function schemas, which may be identified in a function manifest. As part of this semantic matching, the semantic matching module identifies scores for each of the plurality of function schemas. For example, the scores can be based on cosine similarity between vectors representative of the user query and vectors representative of the function schemas. Thus, determination of similarity is simplified relative to other approaches such as LM-based determination of similarity, without occupying an inordinate amount of the LM's context window.

Based on the similarity scores, the processing system filters (e.g., refuses) certain functions according to function-specific thresholds for the similarity scores. For example, the processing system may identify a set of functions that fail to satisfy corresponding function-specific thresholds, and may not provide indications of these functions (such as function schemas of these functions) for LM-based processing. Each function of the function manifest for which a corresponding function-specific threshold is satisfied is provided for LM-based processing. For example, the processing system may provide each of these functions to a function calling microservice for generation of a function plan, function definitions, or the like.

By performing the semantic scoring and filtering of functions, a size of an input to an LM is reduced, which improves performance of the LM and reduces processing and memory usage by improving adherence to context window constraints. For example, the functions that are input to the LM may be more likely to be relevant to the LM's operation relative to an unfiltered set of functions, which improves the quality of the function plan that is generated based on these functions, and which reduces the likelihood of the context window being exceeded. Furthermore, performing the semantic scoring and filtering using cosine similarity is less expensive, in terms of computational resources, than relying only on the LM to select appropriate functions from an unfiltered set of functions. Further, this filtering generally reduces processing and memory resource usage associated with the LM relative to providing unfiltered sets of functions for processing by the LM.

Example Computing Environment

FIG. 1 depicts an example system 100 comprising a sub-system (e.g., system 102) in communication with a machine learning model (e.g., LLM 105) and one or more client devices (e.g., client device 150(1)-(2)). System 102 further comprises one or more microservices 104 that are implemented in series but also can be independently deployable services (or software) that may make up an application. Microservices 104 may enable segmented, granular level functionalities within a larger system infrastructure.

As shown in FIG. 1, system 100 comprises client devices 150(1)-(2) (collectively referred to herein as "client devices 150") and system 102 interconnected through a network 120. Network 120 may be, for example, a direct link, a local area network (LAN), a wide area network (WAN), such as the Internet, another type of network, or a combination of one or more of these networks.

System 102 may be constructed on a server grade hardware platform and include components of a computing device such as, one or more processors (central processing units (CPUs)), one or more memories (random access memory (RAM)), one or more network interfaces (e.g., physical network interfaces (PNICs)), storage 106, and other components (e.g., only storage 106 is shown in FIG. 1).

System 102 in system 100 may host a plurality of microservices 104(1)-(4) (collectively referred to herein as "microservices 104"). The microservices 104 may be deployed using virtual machines (VMs) and/or container(s) running on system 102 (e.g., where system 102 is running a hypervisor (not shown) used to abstract processor, memory, storage, and networking resources of system 102 hardware platform).

Client device 150(1) and client device 150(2) may each include a user interface (UI) 152(1), 152(2), respectively, which may be used to communicate with, at least, a first microservice 104(1), a second microservice 104(2), and/or a third microservice 104(3) using the network 120. For example, communication between client devices 150 and a microservice 104 may be facilitated by one or more application programming interfaces (APIs). Examples of client devices 150 may include a smartphone, a personal computer, a tablet, a laptop computer, and/or other devices.

As shown in FIG. 1, the microservices 104 may include, at least, the first microservice 104(1), the second microservice 104(2), the third microservice 104(3), and the fourth microservice 104(4).

In certain embodiments, the first microservice 104(1) implements a query augmentation system. Additionally, the second microservice 104(2) implements a refusal system. In some aspects, the refusal system applies function-specific thresholds to semantic scores of corresponding functions at run-time to narrow down the list of potential functions input to the third microservice 104(3). By implementing run-time filtering, the refusal system ensures that only the most relevant function are considered for the final planning stage by filtering out less relevant functions based on corresponding semantic scores not meeting the function-specific thresholds. The third microservice 104(3) implements a function calling system that performs function API contract building to construct API contracts required to call the appropriate function, disambiguation to resolve any ambiguities in the user queries or API functions, and creating planning strategies to determine the sequence and nature of API calls/functions needed to respond to the user query. The fourth microservice 104(4) implements a plan validation system, which facilitates hallucination detection and function argument disambiguation to clarify and correct any hallucinations in the arguments required by the functions at run-time.

Though FIG. 1 depicts each of system 102, storage 106, client device 150(1), and client device 150(2) as single devices for case of illustration, system 102, storage 106, client device 150(1), and/or client device 150(2) may be embodied in different forms for different implementations.

Further, though FIG. 1 depicts only a single sub-system (e.g., system 102) and two client devices 150, other embodiments may include more or less sub-systems and/or client devices 150, and client devices 150 may use any combination of microservices 104 on any system 102 where microservices 104 are deployed.

Figure 2:
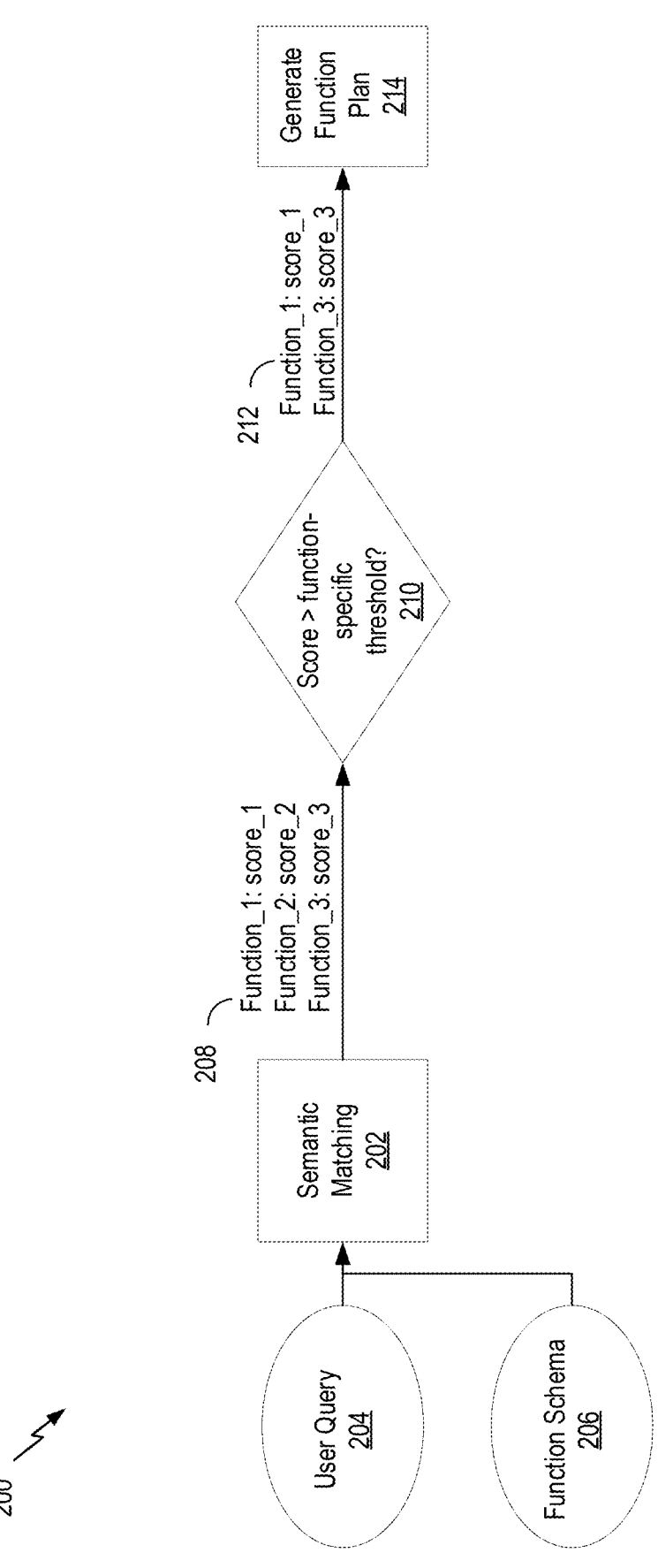
FIG. 2 depicts a flowchart diagram of a method for applying a refusal system to a function manifest.

FIG. 2 depicts a flowchart diagram 200 of a method for applying a refusal system to a function manifest. In some aspects, the operations of diagram 200 may be performed by a processing system or apparatus such as system 100, system 102, microservice 104, client device 150, or system 700. As an overview of components and elements illustrated in FIG. 2, a set of inputs are provided to or obtained by a processing system 200. The set of inputs includes user query 204 and function schema 206. User query 204 comprises user input that is received at a user interface, such as one of user interfaces 152 of FIG. 1. The user interface is configured to facilitate a user's interaction with an automated assistant. For example, a user may access a chatbox user interface associated with or provided by the automated assistant and submit a user query 204 that prompts the automated assistant to help with one more tasks. Some example tasks include asking for help in uploading a form or requesting additional information.

Additionally, function schema 206 is provided as input to help facilitate the semantic analysis of the user query 204 and to assist the LLM in understanding how to access and execute the corresponding function. The function schema 206, shown in further detail in FIGS. 3-4, comprises features associated with a particular function that can be executed as part of a function plan.

FIG. 3 provides an example of a function schema 318, as well as a function plan 302 and a function definition 310 (which are described later). Function schema 318 (representative of function schema 206) is shown comprising a function name 320, an argument category 322, an argument type 324, and a semantic threshold 326. A function name 320 is an identification label associated with a particular function. The function name 320 may be used to call or execute the function. An argument category 322 is a classification of arguments that are used as inputs to the function. An argument type 324 is a type of argument that is compatible with the functionality of the function (e.g., integer, string, binary, etc.). For example, if the function definition is "upload_file(form: 1098)", the function name is "upload_file", the argument category is "form", and the argument type is integer. Additionally, an argument value may be included in the function definition. An argument value is a specific value of an argument to be passed as input to a function. For example, an argument value of "1098" may refer to the 1098 form. In the function definition "upload_file(form: 1098)", "1098" is correctly formatted as an integer, as required by the function schema for the "upload_file" function.

A semantic threshold 326 indicates a threshold for a similarity score between a function associated with the function schema 318, and a user query (e.g., user query 204). If the similarity score satisfies the semantic threshold 326, the processing system includes the function schema 318 (or information identifying the function schema 318 or a function associated with the function schema 318) in an input to a function planning component 214. If the similarity score fails to satisfy the semantic threshold 326, the processing system does not include the function schema 318 (or information identifying the function schema 318 or the function associated with the function schema 318) in the input to the function planning component 214.

Figure 4:
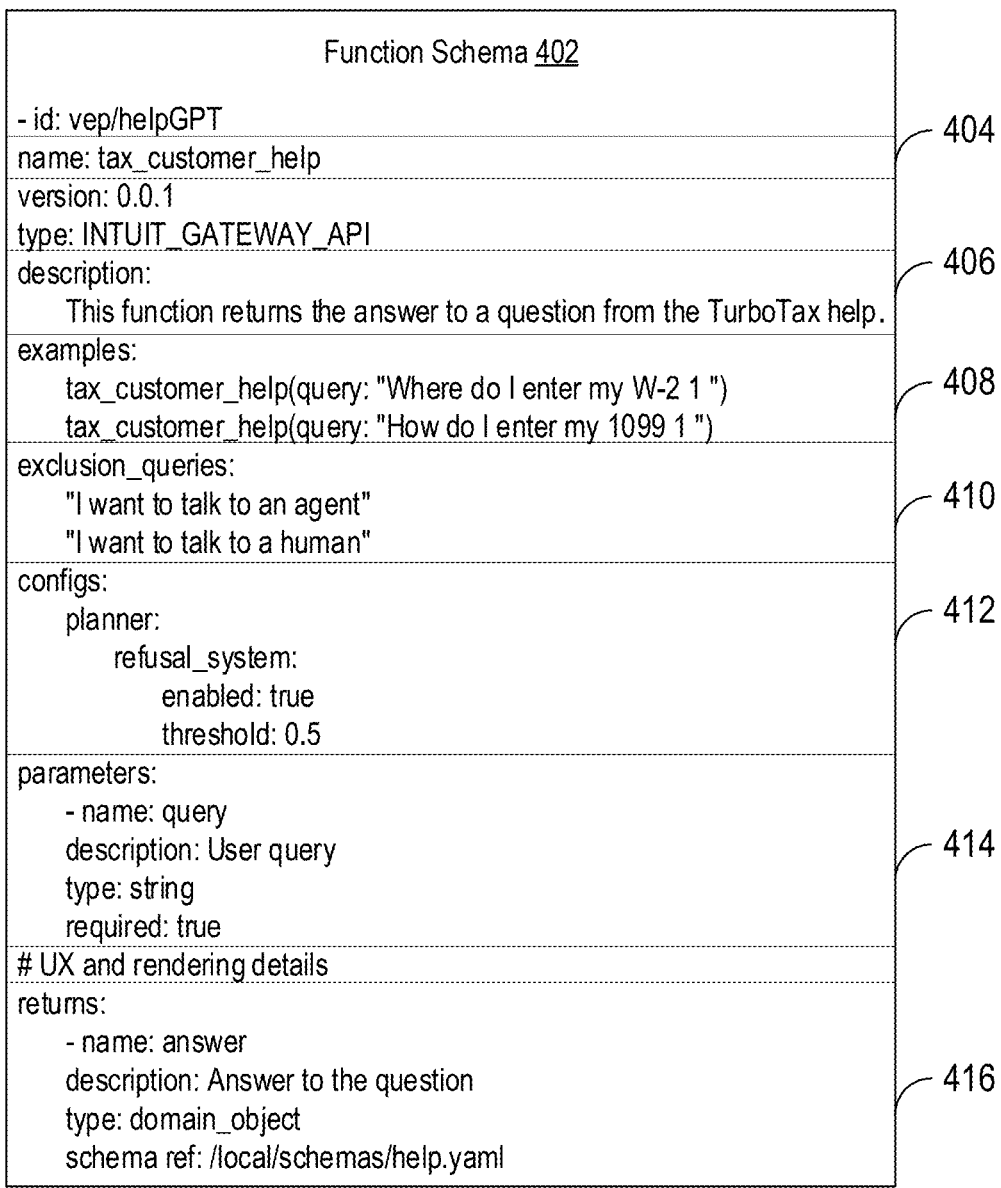
FIG. 4 depicts another example of a function schema.

FIG. 4 provides another example of a function schema 402. The function schema 402 (representative of function schema 318) provides information about a function that returns the answer to a question from an automated assistant (e.g., help chatbot). Function schema 402 comprises a function name 404 (e.g., "tax_customer_help"), function parameters 414, such as an argument category (e.g., "query"), argument type (e.g., "string") and other details about the function. Other function parameters include a description of the argument category (e.g., "User query") and whether the argument is required or optional (e.g., "required: true"). Function schema 402 also includes a function description 406 (e.g., "This function returns the answer to a question from the TurboTax help"), examples 408 of the function definition associated with executing the function (e.g., tax_customer_help (query: "Where do I enter my W-2 1")), and examples of exclusion queries 410 (such as "I want to talk to an agent" or "I want to talk to a human") that indicate a user's escalation when interacting with the automated assistant. "Escalation" refers to a type of user interaction with the automated assistant that indicates that the user wishes to interact with a human representative, instead of the automated assistant. This typically occurs when the user does not find the responses from the automated assistant to be helpful or when the tasks being asked of the automated assistant are beyond the capabilities of the automated assistant.

Function schema 402 also comprises configuration features 412 and return features 416. The configuration features 412 include a feature indicating that a refusal system is enabled for the function schema 402. This may mean that the function schema 402 is subject to filtering according to semantic scores. The configuration features 412 also include a feature indicating a similarity score threshold of 0.5 ("threshold: 0.5"). The return features 416 comprise details about what output(s) the function will return after execution. As shown in FIG. 4, return features 416 comprise a name associated with the return (e.g., "answer"), a description of the return (e.g., "Answer to the question"), a type associated with the return (e.g., "domain_object"), and schema reference/storage location details (e.g., "/local/schemas/help.yaml"). The information and features included in the function schema 402 are structured to help an LLM understand how to interact with the function without human intervention.

Function plan 302 depicted in FIG. 3 comprises a plurality of function definitions (e.g., function definition 304, function definition 306, and function definition 308). A function definition is an output of the function planning component 214, and is described in more detail elsewhere herein. When more than one function definition is included in the function plan, the function plan also comprises a planning strategy that determines the order in which the functions should be executed. The planning strategy can determine a parallel or a series-based execution. The planning strategy takes into consideration (or may be generated based on) dependencies between the different functions, such as if an output from one function corresponds to the input specified for a different function. For example, as illustrated in FIG. 3, the arrows between the function definitions indicate that the order of operation of the functions associated with the function definitions is as follows: function definition 304 will be executed first, followed by the function associated with function definition 306, and then followed by the function associated with the function definition 308. The planning strategy ensures that the functions are executed in the correct order to prevent errors in function outputs or fail states of the different functions.

Returning to FIG. 2, a semantic matching component 202 determines semantic scores based on the user query 204 and the function schemas 206. For example, the semantic matching component 202 may receive, as input, a function manifest that includes the function schemas 206. The semantic matching component 202 determines semantic scores based on the function schemas 206 and the user query 204. A semantic score for a given function schema 206 indicates how semantically similar content of the given function schema 206 is to content of the user query 204.

In some aspects, the processing system (e.g., semantic matching component 202) may generate embeddings of the user query 204 and the function schemas 206. For example, the embeddings may include first embeddings associated with (e.g., derived from) the user query 204 and second embeddings associated with (e.g., derived from) the function schemas 206. In some aspects, the embeddings are generated using an LM, such as a transformer-based LM. The LM includes or utilizes a tokenizer that has been trained on input information. This tokenizer provides for the input text to be used to generate (e.g., broken down into) tokens that the LM can understand and process efficiently. In some aspects, the processing system tokenizes multiple aspects of a function schema 206. For example, the processing system may tokenize a function name 404, a function description 406, examples 408, or a combination thereof.

Once the user query 204 and function schemas 206 are tokenized, the processing system converts these tokens into vector representations, known as embeddings. These embeddings capture or represent semantic meaning of the user query 204 and the function schemas 206, allowing the processing system to understand the context and relationships between different elements of the user query 204 and the function schemas 206. In some aspects, the processing system generates embeddings for multiple aspects of a function schema 206. For example, the processing system may generate respective embeddings for a function name 404, a function description 406, examples 408, or a combination thereof. In some aspects, these embeddings of the function schema 206 may be generated prior to runtime and stored. For example, the processing system may store a database of embeddings derived from function schemas 206 available to the processing system, thereby reducing latency and processing burden at runtime.

The similarity scores may include, for example, cosine similarity scores or the like. To determine the similarity score between a user query 204 and a function schema 206 (or a feature of a function schema 206), the processing system calculates a metric such as a cosine similarity. A cosine similarity metric measures the cosine of the angle between two vectors (in this case, embeddings of the user query and the function schema or feature) in a multi-dimensional space, providing a value that indicates how closely related the two embeddings are. A higher cosine similarity score suggests that the user query 204 and the function schema 206 or feature are more semantically aligned. In some aspects, a given function schema 206 is associated with multiple similarity scores. For example, the processing system may determine a respective similarity score for each of a function name 404, a function description 406, examples 408, or a combination thereof. Generating the multiple similarity scores improves the likelihood that semantic similarity is properly determined for a given user query 204. For example, in some cases, an example 408 may be more semantically similar to a user query 204 than a function name 404, and may provide a better measure of true similarity than the function name 404. Using the multiple similarity scores improves flexibility and resilience to variable user queries 204.

As shown, at 208, the semantic matching component 202 outputs a set of similarity scores for a set of functions (including Function_1, Function_2, and Function_3). In some aspects, a similarity score is generated by combining multiple similarity scores. For example, a similarity score for a given function may be generated by combining (e.g., averaging, taking a median of) similarity scores derived from a function name 404, an example 408, and a function description 406 of the given function. As another example, a similarity score for a given function may use a highest (e.g., indicating a highest similarity) similarity score of similarity scores derived from a function name 404, an example 408, and a function description 406 of the given function.

In some aspects, the processing system generates the similarity scores using a supervised model. For example, the supervised model may include an LM. The supervised model may be trained on labeled historical data, such as a training set of user queries, function schemas, and similarity scores corresponding to user-query-function-schema pairs. This training may be performed using any suitable machine learning algorithm. The supervised model may receive, as input, a user query and a function schema. The supervised model may output a similarity score corresponding to the user query and the function schema.

At 210, the processing system determines if a similarity score satisfies a function-specific threshold. As mentioned, the function-specific threshold for a given function is identified by a configuration feature 412, included in a function schema 402 of the given function, that defines the function-specific threshold.

In some aspects, the function-specific threshold, or the similarity score, may be based on a context window of the LM. For example, the processing system may adjust a function-specific threshold or a similarity score so that a number of functions that are provided to the function planning component 214 fit within the context window. As another example, if the context window of the function planning component 214 (e.g., LLM 105) is exceeded, the function planning component 214 may provide a flag that indicates the context window has been exceeded, and the processing system may adjust the function-specific threshold or the similarity score to reduce the number of functions that are provided to the function planning component 214.

As shown, at 212, the processing system provides a subset of functions, of the set of functions for which the similarity scores were determined, that are associated with similarity scores that satisfy the function-specific threshold. For example, each function, of the set of functions, has a respective similarity score that satisfies a function-specific threshold of that function. The processing system provides the subset of functions to the function planning component 214.

As shown, the function planning component 214 generates a function plan. The function planning component 214 uses the user query 204 and the function schema 206 to generate a function plan. For example, the function planning component 214 may select, from a plurality of potential functions indicated by the subset of functions provided at 212, one or more functions based on the user query 204. The function planning component 214 may comprise an LM-based service. For example, the function planning component 214 may process inputs and generate outputs using an LM such as an LLM. In some aspects, the function planning component 214 includes an LLM.

The function planning component 214 selects this set of functions based on the function schema 206. For example, the function planning component 214 (e.g., an LLM of the function planning component 214) may compare the user query 204 and the function schema 206 to identify appropriate functions. The function planning component 214 then constructs function API contracts for each of the selected set of functions according to the function schema 206. For example, the function planning component 214 (e.g., the LLM) may extract parameters for a given function, such as a function name, function arguments, and an output of the function, from the function schema 206. The function planning component 214 uses these parameters to generate computer code that calls or triggers execution of the function. In some examples, as described herein, the function planning component 214 configures a series of functions to be run in series, or a set of functions to be run in parallel, based on inputs and outputs of the set of functions.

Figure 5:
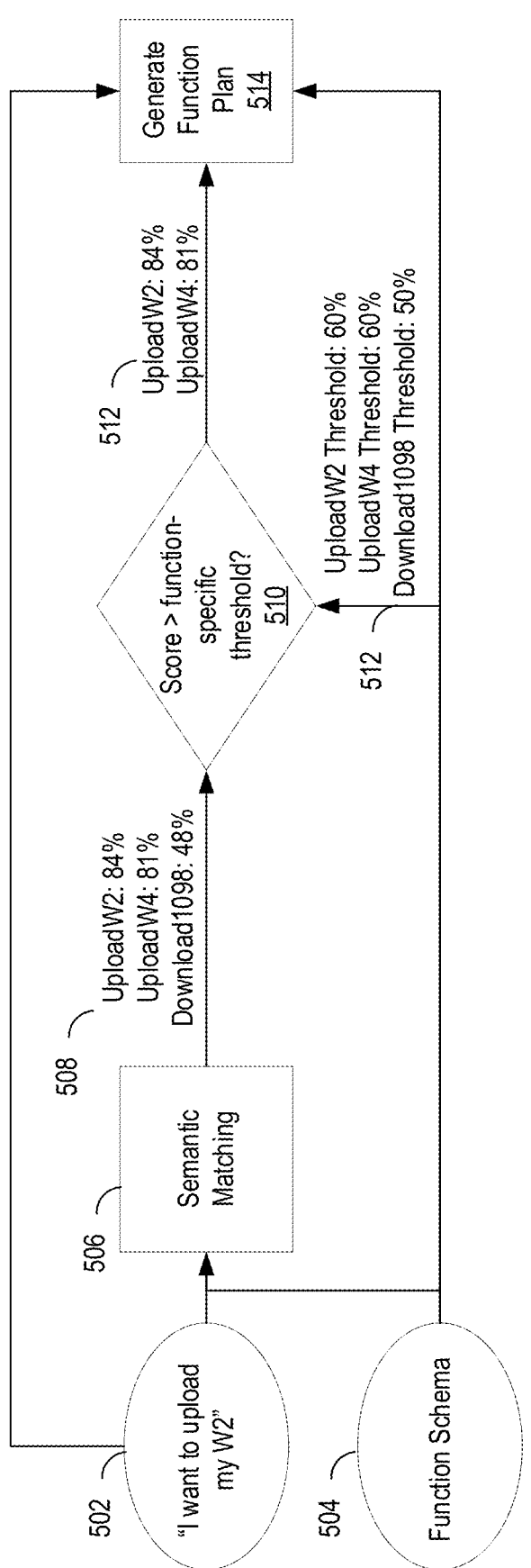
FIG. 5 depicts another flowchart diagram of a method for applying a refusal system to a function manifest.

FIG. 5 depicts another flowchart diagram 500 of a method for applying a refusal system to a function manifest. In some aspects, the operations of diagram 500 may be performed by a processing system such as system 100, system 102, microservice 104, client devices 150, or processing system 700.

As shown, the processing system receives a user query 502 ("I want to upload my W2") and function schemas 504 corresponding to a set of functions. The user query relates to a task. Here, the task is uploading a W2 form. The processing system described in connection with FIG. 5 selects a subset of functions, at runtime, for which to generate a function plan in order to perform the task (or assist a user that inputs the user query with performing the task) indicated by the user query 502.

The processing system may obtain a function manifest that includes the function schemas 504. In some aspects, the processing system may obtain a set of embeddings corresponding to the set of functions or the function schemas 504. For example, the processing system (e.g., semantic matching component 506, which may be an example of semantic matching component 202) may generate and store the set of embeddings (e.g., prior to receiving the user query 502). The processing system may further generate one or more embeddings for the user query 502, as described above.

As shown, the semantic matching component 506 determines semantic scores for the function schemas 504 (e.g., the set of functions corresponding to the function schemas 504). The semantic scores are shown at 508 for three example functions named "UploadW2" (with a score of 84%), "UploadW4" (with a score of 81%), and "Download1098" (with a score of 48%). Here, "UploadW2" and "UploadW4" are associated with relatively higher similarity scores than "Download1098," since "UploadW2" and "UploadW4" (such as the function names "UploadW2" and "UploadW4", or examples 408 from function schemas 504 corresponding to "UploadW2" and "UploadW4") are more semantically similar to the user query 502 ("I want to upload my W2") than is "Download1098."

As shown, at 510, the processing system determines whether the semantic scores shown at 508 satisfy corresponding function-specific thresholds. The corresponding function-specific thresholds are shown at 512, and are obtained from the function schemas 504. The processing system performs this determination at runtime (e.g., upon receiving the user query 502). As shown, "UploadW2" and "UploadW4" are each associated with a function-specific threshold of 60%, and "Download1098" is associated with a function-specific threshold of 50%. Thus, at 512, the "UploadW2" and "UploadW4" functions are passed to the function planning component 514 (which may be an example of function planning component 214) as a subset of functions, and the "Download1098" function is not passed to the function planning component 514.

As shown, the function planning component 514 generates a function plan. The function planning component 514 uses the user query 502 and the function schema 504 to generate the function plan.

By passing only the functions with semantic scores that satisfy the respective function-specific thresholds to the function planning component 514, the processing system reduces processing and memory resource usage relative to passing all of the functions identified by function schemas 504. Furthermore, the number of functions that can be included in the function schemas 504 without exceeding the context window size of the function planning component 514. Still further, filtering (e.g., refusal) can be implemented for functions in a less computationally expensive fashion than filtering the functions at the function planning component 514 (e.g., using an LLM). Furthermore, performance of the function planning component 514 is improved relative to an approach where functions are indiscriminately passed to the function planning component 514 without regard to a context window size of the function planning component 514.

FIG. 6 shows a method 600 for selecting functions. In some aspects, method 600 may be performed by an apparatus or processing system, such as system 100, system 102, microservice 104, client devices 150, or processing system 700.

Method 600 begins at block 605 with receiving, as input, a user query (e.g., user query 204, user query 502).

Method 600 then proceeds to block 610 with obtaining a plurality of function schemas (e.g., function schema 206, function schema 318, function schema 402, function schema 504) that include function descriptions and examples for a plurality of functions.

Method 600 then proceeds to block 615 with generating, for the user query and based on the plurality of function schemas, a plurality of similarity scores (e.g., at 202 or 508), the plurality of similarity scores including a respective set of similarity scores (e.g., one or more similarity scores) for each function of the plurality of functions.

Method 600 then proceeds to block 620 with selecting, based on the plurality of similarity scores and a plurality of function-specific thresholds corresponding to the plurality of functions, a subset of the functions as relevant functions for the user query (e.g., at 512 or 212).

Method 600 then proceeds to block 625 with generating a function plan (e.g., at 214 or 514) that comprises one or more function definitions for one or more functions of the subset of the functions.

Method 600 then proceeds to block 630 with executing the function plan. For example, the processing system may provide or execute a set of function definitions (e.g., function calls, API contracts) in accordance with the function plan.

In some aspects, block 615 includes generating, for a function of the plurality of functions, multiple similarity scores; and determining a similarity score, of the plurality of similarity scores, for the function using the multiple similarity scores.

In some aspects, the plurality of function-specific thresholds comprises a function-specific threshold for a function of the plurality of functions, wherein the function-specific threshold is based on historical data regarding user queries, similarity scores corresponding to the user queries, or selected functions corresponding to the user queries.

In some aspects, the plurality of similarity scores are based on embeddings of the user query and embeddings of information included in the function schemas.

In some aspects, the plurality of similarity scores comprise cosine similarity scores for the embeddings of the user query and the embeddings of the information included in the function schemas.

In some aspects, block 615 includes generating the plurality of similarity scores using a supervised model.

In some aspects, block 625 includes generating the function plan using a LM based service, wherein a quantity of the subset of functions is based on a context window size of the LM-based service.

In some aspects, block 625 includes receiving, at the LM based service, information identifying the subset of functions, wherein the information identifying the subset of functions does not exceed the context window size of the LM-based service.

Figure 7:
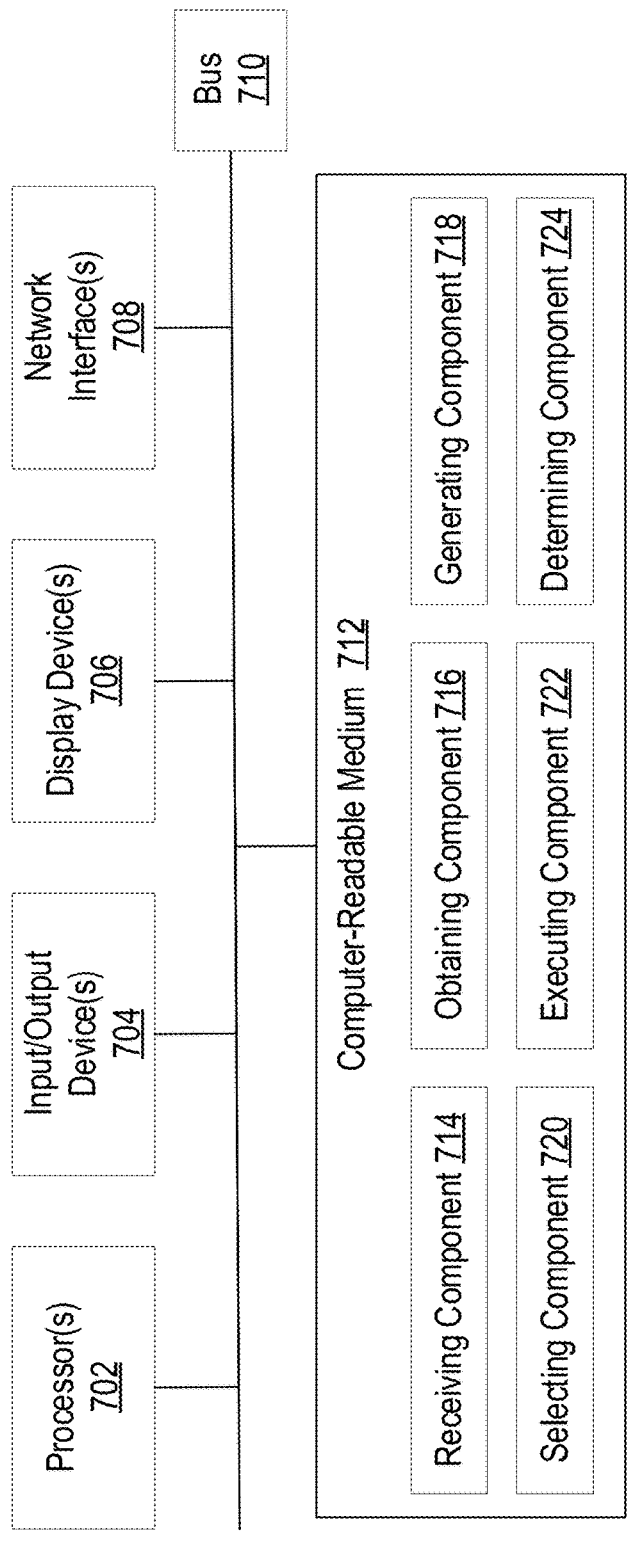
FIG. 7 depicts an example processing system with which aspects of the present disclosure can be performed.

In some aspects, method 600, or any aspect related to it, may be performed by an apparatus or processing system, such as processing system 700 of FIG. 7, which includes various components operable, configured, or adapted to perform the method 600. Processing system 700 is described below in further detail.

Note that FIG. 6 is just one example of a method, and other methods including fewer, additional, or alternative operations are possible consistent with this disclosure.

Example Processing System for Selecting Functions

FIG. 7 depicts an example processing system 700 configured to perform various aspects described herein, including, for example, method 600 as described above with respect to FIG. 600.

Processing system 700 is generally an example of an electronic device configured to execute computer-executable instructions, such as those derived from compiled computer code, including without limitation personal computers, tablet computers, servers, smart phones, smart devices, wearable devices, augmented and/or virtual reality devices, and others.

In the depicted example, processing system 700 includes one or more processors 702, one or more input/output devices 704, one or more display devices 706, one or more network interfaces 708 through which processing system 700 is connected to one or more networks (e.g., a local network, an intranet, the Internet, or any other group of processing systems communicatively connected to each other), and computer-readable medium 712. In the depicted example, the aforementioned components are coupled by a bus 710, which may generally be configured for data exchange amongst the components. Bus 710 may be representative of multiple buses, while only one is depicted for simplicity.

Processor(s) 702 are generally configured to retrieve and execute instructions stored in one or more memories, including local memories like computer-readable medium 712, as well as remote memories and data stores. Similarly, processor(s) 702 are configured to store application data residing in local memories like the computer-readable medium 712, as well as remote memories and data stores. More generally, bus 710 is configured to transmit programming instructions and application data among the processor(s) 702, display device(s) 706, network interface(s) 708, and/or computer-readable medium 712. In certain embodiments, processor(s) 702 are representative of a one or more central processing units (CPUs), graphics processing unit (GPUs), tensor processing unit (TPUs), accelerators, and other processing devices.

Input/output device(s) 704 may include any device, mechanism, system, interactive display, and/or various other hardware and software components for communicating information between processing system 700 and a user of processing system 700. For example, input/output device(s) 704 may include input hardware, such as a keyboard, touch screen, button, microphone, speaker, and/or other device for receiving inputs from the user and sending outputs to the user.

Display device(s) 706 may generally include any sort of device configured to display data, information, graphics, user interface elements, and the like to a user. For example, display device(s) 706 may include internal and external displays such as an internal display of a tablet computer or an external display for a server computer or a projector. Display device(s) 706 may further include displays for devices, such as augmented, virtual, and/or extended reality devices. In various embodiments, display device(s) 716 may be configured to display a graphical user interface.

Network interface(s) 708 provide processing system 700 with access to external networks and thereby to external processing systems. Network interface(s) 708 can generally be any hardware and/or software capable of transmitting and/or receiving data via a wired or wireless network connection. Accordingly, network interface(s) 708 can include a communication transceiver for sending and/or receiving any wired and/or wireless communication.

Computer-readable medium 712 may be a volatile memory, such as a random access memory (RAM), or a nonvolatile memory, such as nonvolatile random access memory (NVRAM), or the like. In this example, computer-readable medium 712 includes receiving component 714, obtaining component 716, generating component 718, selecting component 720, executing component 722, and determining component 724. Processing of the components 714-726 may enable and cause the processing system 700 to perform: the method 600 as described above with respect to FIG. 6, or any aspect related to it.

In certain embodiments, receiving component 714 is configured to receive, as input, a user query, as described in FIG. 6 with reference to block 605. In certain embodiments, obtaining component 716 is configured to obtain a plurality of function schemas that include function descriptions and examples for a plurality of functions, as described in FIG. 6 with reference to block 610. In certain embodiments, generating component 718 is configured to generate, for the user query and based on the plurality of function schemas, a plurality of similarity scores, the plurality of similarity scores including a respective set of similarity scores for each function of the plurality of functions, as described in FIG. 6 with reference to block 615. In certain embodiments, selecting component 720 is configured to select, based on the plurality of similarity scores and a plurality of function-specific thresholds corresponding to the plurality of functions, a subset of the functions as relevant functions for the user query, as described in FIG. 6 with reference to block 620. In certain embodiments, generating component 718 is configured to generate a function plan that comprises one or more function definitions for one or more functions of the subset of the functions, as described in FIG. 6 with reference to block 625. In certain embodiments, executing component 722 is configured to execute the function plan, as described in FIG. 6 with reference to block 630.

Note that FIG. 7 is just one example of a processing system consistent with aspects described herein, and other processing systems having additional, alternative, or fewer components are possible consistent with this disclosure.

Example Clauses

Implementation examples are described in the following numbered clauses:

Clause 1: A computer-implemented method for selecting functions, comprising: receiving, as input, a user query; obtaining a plurality of function schemas that include function descriptions and examples for a plurality of functions; generating, for the user query and based on the plurality of function schemas, a plurality of similarity scores, the plurality of similarity scores including a respective set of similarity scores for each function of the plurality of functions; selecting, based on the plurality of similarity scores and a plurality of function-specific thresholds corresponding to the plurality of functions, a subset of the functions as relevant functions for the user query; generating a function plan that comprises one or more function definitions for one or more functions of the subset of the functions; and executing the function plan.

Clause 2: The method of Clause 1, wherein generating the plurality of similarity scores comprises generating, for a function of the plurality of functions, multiple similarity scores; and determining a similarity score, of the plurality of similarity scores, for the function using the multiple similarity scores.

Clause 4: The method of any one of Clauses 1-3, wherein the plurality of function-specific thresholds comprises a function-specific threshold for a function of the plurality of functions, wherein the function-specific threshold is based on historical data regarding user queries, similarity scores corresponding to the user queries, or selected functions corresponding to the user queries.

Clause 5: The method of any one of Clauses 1-4, wherein the plurality of similarity scores are based on embeddings of the user query and embeddings of information included in the function schemas.

Clause 6: The method of Clause 5, wherein the plurality of similarity scores comprise cosine similarity scores for the embeddings of the user query and the embeddings of the information included in the function schemas.

Clause 7: The method of any one of Clauses 1-6, wherein generating the plurality of similarity scores comprises generating the plurality of similarity scores using a supervised model.

Clause 8: The method of any one of Clauses 1-7, wherein generating the function plan comprises generating the function plan using a LM based service, wherein a quantity of the subset of functions is based on a context window size of the LM-based service.

Clause 9: The method of Clause 8, wherein generating the function plan comprises receiving, at the LM based service, information identifying the subset of functions, wherein the information identifying the subset of functions does not exceed the context window size of the LM-based service.

Clause 10: A method, comprising: receiving, as input, a user query; obtaining a plurality of function schemas that include function descriptions and examples for a plurality of functions; generating, for the user query and based on the plurality of function schemas, a plurality of similarity scores, the plurality of similarity scores including a respective set of similarity scores for each function of the plurality of functions; selecting, based on the plurality of similarity scores and a plurality of function-specific thresholds corresponding to the plurality of functions, a subset of the functions as relevant functions for the user query; generating, using a LM based service, a function plan that comprises one or more function definitions for one or more functions of the subset of the function; and executing the function plan.

Clause 11: The method of Clause 10, wherein generating the plurality of similarity scores comprises generating, for a function of the plurality of functions, multiple similarity scores; and determining a similarity score, of the plurality of similarity scores, for the function using the multiple similarity scores.

Clause 13: The method of any one of Clauses 10-12, wherein the plurality of function-specific thresholds comprises a function-specific threshold for a function of the plurality of functions, wherein the function-specific threshold is based on historical data regarding user queries, similarity scores corresponding to the user queries, or selected functions corresponding to the user queries.

Clause 14: The method of any one of Clauses 10-13, wherein the plurality of similarity scores are based on embeddings of the user query and embeddings of information included in the function schemas.

Clause 15: The method of Clause 14, wherein the plurality of similarity scores comprise cosine similarity scores for the embeddings of the user query and the embeddings of the information included in the function schemas.

Clause 16: The method of any one of Clauses 10-15, wherein generating the plurality of similarity scores comprises generating the plurality of similarity scores using a supervised model.

Clause 17: The method of any one of Clauses 10-16, wherein generating the function plan comprises providing, to the LM based service, information identifying the subset of functions, wherein the information identifying the subset of functions does not exceed a context window size of the LM-based service.

Clause 18: The method of Clause 17, wherein the information identifying the subset of functions includes function schemas of the subset of functions and similarity scores of the subset of functions.

Clause 19: The method of any one of Clauses 10-18, wherein an example of the examples, relating to a function of the plurality of functions, is a user query example relevant to the function.

Clause 20: A method, comprising: receiving, as input, a user query relating to a task; obtaining a plurality of function schemas that include function descriptions and examples for a plurality of functions; generating, for the user query and based on the plurality of function schemas, a plurality of similarity scores, the plurality of similarity scores including a respective set of similarity scores for each function of the plurality of functions; selecting, based on the plurality of similarity scores and a plurality of function-specific thresholds corresponding to the plurality of functions, a subset of the functions as relevant functions for performing the task relating to the user query; generating, by a LM based service, a function plan that comprises one or more function definitions for one or more functions of the subset of the functions, the one or more function; and executing the function plan to perform the task.

Clause 21: A processing system, comprising: a memory comprising computer-executable instructions; and a processor configured to execute the computer-executable instructions and cause the processing system to perform a method in accordance with any one of Clauses 1-20.

Clause 22: A processing system, comprising means for performing a method in accordance with any one of Clauses 1-20.

Clause 23: A non-transitory computer-readable medium storing program code for causing a processing system to perform the steps of any one of Clauses 1-20.

Clause 24: A computer program product embodied on a computer-readable storage medium comprising code for performing a method in accordance with any one of Clauses 1-20.

Additional Considerations

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A computer-implemented method for selecting functions, comprising:

receiving, as input, a user query;

obtaining a plurality of function schemas that include function descriptions and examples for a plurality of functions;

generating, for the user query and based on the plurality of function schemas, a plurality of similarity scores, the plurality of similarity scores including a respective set of similarity scores for each function of the plurality of functions;

selecting, based on the plurality of similarity scores and a plurality of function-specific thresholds corresponding to the plurality of functions, a subset of the functions as relevant functions for the user query;

generating, based on the user query and the plurality of function schemas, a function plan that comprises one or more function definitions for one or more functions of the subset of the functions; and executing the function plan.

2. The method of claim 1, wherein generating the plurality of similarity scores comprises generating, for a function of the plurality of functions, multiple similarity scores; and determining a similarity score, of the plurality of similarity scores, for the function using the multiple similarity scores.

3. The method of claim 2, where a first similarity score of the multiple similarity scores is for a function description of the function and a second similarity score of the multiple similarity scores is for an example of the function.

4. The method of claim 1, wherein the plurality of function-specific thresholds comprises a function-specific threshold for a function of the plurality of functions, wherein the function-specific threshold is based on historical data regarding user queries, similarity scores corresponding to the user queries, or selected functions corresponding to the user queries.

5. The method of claim 1, wherein the plurality of similarity scores are based on embeddings of the user query and embeddings of information included in the plurality of function schemas.

6. The method of claim 5, wherein the plurality of similarity scores comprise cosine similarity scores for the embeddings of the user query and the embeddings of the information included in the function schemas.

7. The method of claim 1, wherein generating the plurality of similarity scores comprises generating the plurality of similarity scores using a supervised model.

8. The method of claim 1, wherein generating the function plan comprises generating the function plan using a language model (LM)-based service, wherein a quantity of the subset of functions is based on a context window size of the LM-based service.

9. The method of claim 8, wherein generating the function plan comprises receiving, at the LM based service, information identifying the subset of functions, wherein the information identifying the subset of functions does not exceed the context window size of the LM-based service.

10. A non-transitory computer-readable medium comprising instructions that, when executed by one or more processors of a processing system, cause the processing system to:

receive, as input, a user query;

obtain a plurality of function schemas that include function descriptions and examples for a plurality of functions;

generate, for the user query and based on the plurality of function schemas, a plurality of similarity scores, the plurality of similarity scores including a respective set of similarity scores for each function of the plurality of functions;

select, based on the plurality of similarity scores and a plurality of function-specific thresholds corresponding to the plurality of functions, a subset of the plurality of functions as relevant functions for the user query;

generate, based on the user query and the plurality of function schemas, a function plan that comprises one or more function definitions for one or more functions of the subset of the plurality of functions; and execute the function plan.

11. The non-transitory computer-readable medium of claim 10, wherein generating the plurality of similarity scores comprises generating, for a function of the plurality of functions, multiple similarity scores; and determining a similarity score, of the plurality of similarity scores, for the function using the multiple similarity scores.

12. The non-transitory computer-readable medium of claim 11, where a first similarity score of the multiple similarity scores is for a function description of the function and a second similarity score of the multiple similarity scores is for an example of the function.

13. The non-transitory computer-readable medium of claim 10, wherein the plurality of function-specific thresholds comprises a function-specific threshold for a function of the plurality of functions, wherein the function-specific threshold is based on historical data regarding user queries, similarity scores corresponding to the user queries, or selected functions corresponding to the user queries.

14. The non-transitory computer-readable medium of claim 10, wherein the plurality of similarity scores are based on embeddings of the user query and embeddings of information included in the plurality of function schemas.

15. The non-transitory computer-readable medium of claim 14, wherein the plurality of similarity scores comprise cosine similarity scores for the embeddings of the user query and the embeddings of the information included in the plurality of function schemas.

16. The non-transitory computer-readable medium of claim 10, wherein the instructions, to cause the processing system to generate the plurality of similarity scores, are configured to cause the processing system to generate the plurality of similarity scores using a supervised model.

17. The non-transitory computer-readable medium of claim 10, wherein the instructions, to cause the processing system to generate the function plan, are configured to cause the processing system to generate the function plan using a language model (LM)-based service, wherein a quantity of the subset of the functions is based on a context window size of the LM-based service.

18. The non-transitory computer-readable medium of claim 17, wherein the instructions, to cause the processing system to generate the function plan, are configured to cause the processing system to receive, at the LM-based service, information identifying the subset of functions, wherein the information identifying the subset of functions does not exceed the context window size of the LM-based service.

19. A processing system comprising one or more processors and one or more memories, the one or more processors configured to cause the processing system to:

receive, as input, a user query;

obtain a plurality of function schemas that include function descriptions and examples for a plurality of functions;

generate, for the user query and based on the plurality of function schemas, a plurality of similarity scores, the plurality of similarity scores including a respective set of similarity scores for each function of the plurality of functions;

select, based on the plurality of similarity scores and a plurality of function-specific thresholds corresponding to the plurality of functions, a subset of the plurality of functions as relevant functions for the user query;

generate, based on the user query and the plurality of function schemas, a function plan that comprises one or more function definitions for one or more functions of the subset of the plurality of functions; and execute the function plan.

20. The processing system of claim 19, wherein the plurality of function-specific thresholds comprises a function-specific threshold for a function of the plurality of functions, wherein the function-specific threshold is based on historical data regarding user queries, similarity scores corresponding to the user queries, or selected functions corresponding to the user queries.

\* \* \* \* \*